(12) United States Patent
Sabarinathan

(10) Patent No.: US 9,834,092 B2
(45) Date of Patent: Dec. 5, 2017

(54) LINEAR BAR GRAPH

(71) Applicant: Krishnan Sabarinathan, Chennai (IN)

(72) Inventor: Krishnan Sabarinathan, Chennai (IN)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 15/152,101

(22) Filed: May 11, 2016

(65) Prior Publication Data

US 2016/0332518 A1    Nov. 17, 2016

(30) Foreign Application Priority Data

May 11, 2015   (IN) .............................. 509/KOL/2015

(51) Int. Cl.
*B60Q 1/00* (2006.01)
*B60K 37/02* (2006.01)
*B60Q 9/00* (2006.01)

(52) U.S. Cl.
CPC ................ *B60K 37/02* (2013.01); *B60Q 9/00* (2013.01); *B60K 2350/206* (2013.01)

(58) Field of Classification Search
CPC .......... B60Q 3/042; B60Q 9/00; B60Q 37/02; B60K 2350/206

USPC ........ 340/438, 488, 444; 116/287, 288, 332, 116/62.1, 62.4
See application file for complete search history.

(56) References Cited

U.S. PATENT DOCUMENTS

| 7,357,096 B2 * | 4/2008 | Tane ...................... G01D 11/28 116/288 |
| 2006/0208521 A1 * | 9/2006 | Munro ................... B60K 37/02 296/70 |
| 2013/0002414 A1 * | 1/2013 | Konet ..................... B60K 37/06 340/436 |

* cited by examiner

*Primary Examiner* — Tai T Nguyen
(74) *Attorney, Agent, or Firm* — Dickinson Wright PLLC

(57) ABSTRACT

The present invention discloses an automotive instrument cluster with a continuous LED bar graph. The automotive instrument includes a base, LED light sources placed on the base, LED compartments resulting from mounting plate separating plurality of LED lights from each other, an applique covering the top surfaces of the LED compartments wherein the top surface of the applique is perceived by a user, and the bottom surface of the applique covers the LED compartments from inside. The mounting plate is designed in a manner that the inner walls of subsequent LED compartments maintain a predetermined gap with bottom surface of the applique to enable the light to pass to the adjacent LED compartment.

7 Claims, 1 Drawing Sheet

LINEAR BAR GRAPH

CROSS-REFERENCE TO RELATED APPLICATION

This patent application claims priority to Indian Patent Application No. 509/KOL/2015, filed May 11, 2015, entitled "LINEAR BAR GRAPH," the entire disclosure of the application being considered part of the disclosure of this application and hereby incorporated by reference.

BACKGROUND

LED bar graph gauges are used in automotive instrument cluster applications. These bar graphs are made by placing LEDs on each compartment of a mounting plate. These types of gauges include a separate compartment (light box) for each LED's. Therefore, such gauges contain gap (separator) between the each bar graphs (as shown in FIG. 1a). The gap is produced due to wall thickness of the light box and the applique process parameter considerations.

In view of the above discussion, it may be realized that an improvement to the conventional bar graph gauges with gap between bars may be provided as a continuous LED bar graph for automotive instrument cluster.

SUMMARY

The primary object of the present invention is to provide a continuous LED bar graph for automotive instrument cluster without any spacing.

In order to achieve the above mentioned object, the present invention discloses an automotive instrument cluster with a continuous LED bar graph including a base, plurality of LED light sources placed on the base, plurality of LED compartments resulting from mounting plate separating plurality of LED lights from each other, an applique covering the top surfaces of the plurality of LED compartments wherein the top surface of the applique is perceived by a user, and the bottom surface of the applique covers the plurality of LED compartments from inside, characterized in that, the mounting plate is designed in a manner that the inner walls of subsequent LED compartments maintain a predetermined gap with bottom surface of the applique to enable the light to pass to the adjacent LED compartment.

In one embodiment, the LED light sources are placed on the base in a manner that the user perceives the continuous bar graph.

In one embodiment, the base may be a PWB base.

In one embodiment, the applique may be printing on a PC sheet or painted and laser etched on plastic.

In one embodiment, the LED compartments are either integrated with the mounting plate or a separate lighting compartment module fitted with mounting plate or PWB base fitted therewith separately.

In one embodiment, the shape of the LED compartments may be square or rectangular or trapezoid or curved or triangular or circular or semicircular or elliptical.

In one embodiment, the design of the each bar graph may be square or rectangular or trapezoid or curved or triangular or circular or semicircular or elliptical.

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and together with the description serve to explain the principles and operation of the invention.

BRIEF DESCRIPTION OF THE DRAWINGS

The above-mentioned and other features and other advantages of the invention will be better understood and will become more apparent by referring to the exemplary embodiments of the invention, as illustrated in the accompanying drawings, wherein.

DETAIL DESCRIPTION

Reference will now be made to the exemplary embodiments of the invention, as illustrated in the accompanying drawings. Where ever possible same numerals will be used to refer to the same or like parts.

Figure 1A:
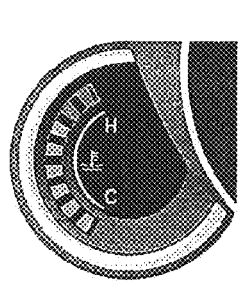
FIG. 1a illustrates a conventional automotive instrument cluster as prior art.
Figure 1A:
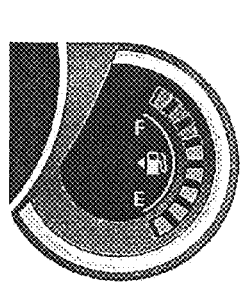
Figure 1B:
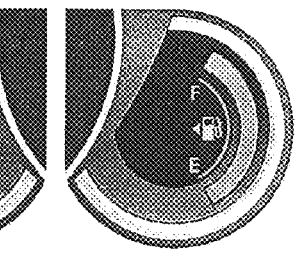
FIG. 1b illustrates an automotive instrument cluster with a continuous LED bar graph according to one embodiment.

Disclosed herein is an automotive instrument panel with a continuous LED (Light Emitting Diode) bar graph. FIG. 1b illustrates such an automotive instrument cluster with a continuous LED bar graph according to one embodiment of the present invention.

LED bar graphs are shown without gap or separation. The aspects disclosed herein enhance the cluster appearance. LED bar graphs are shown, such as the TFTs which enhance the appearance of the cluster.

Figure 2:
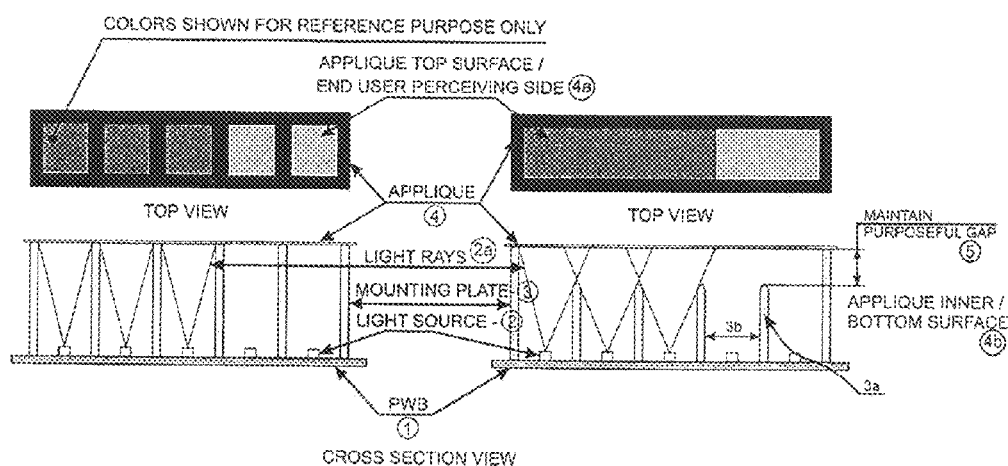
FIG. 2 illustrates cross-section view of a continuous LED bar graph according to one embodiment of the present invention.

FIG. 2 illustrates a cross-section view of a continuous LED bar graph according to one embodiment of the present invention. The instrument cluster includes a base as PWB (1). The LED light sources (2) are placed on the PWB base (1). The LED lights are separated from each other by mounting plate (3). The mounting plates separate LED lights from each other resulting in LED compartments. The LED compartments are either integrated with the mounting plate or fitted separately. The mounting plate is covered by applique (4). For example, the applique may be printing on a PC sheet or painted and laser etched on plastic. The user perceives the top surface (4a) of the applique. The bottom surface (4b) of the applique covers the instrument cluster from inside. In the conventional design, the upper end of the mounting plates touch inner surface of the applique. However in the present invention, mounting plate/independent compartment (3) is designed in such a way that the inner walls (3a) of subsequent compartment maintains purpose full gap (5) with printed applique inner/bottom surface (4b) to enable the light to pass to the adjacent compartment (3b). Thereby end user can see the continuous bar graph (without gap) on applique top surface (4a) similar to the appeal of TFT.

In mounting plate, LED compartments (Light box) are provided in such a way that the LED bar graphs are shown as a linear bar—without gap between each bar graphs.

The shape of the LED compartments may be square or rectangular or trapezoid or curved or triangular or circular or semicircular or elliptical. Accordingly, each bar graph may be square or rectangular or trapezoid or curved or triangular or circular or semicircular or elliptical.

It is to be understood by a person of ordinary skill in the art that various modifications and variations may be made without departing from the scope and spirit of the present invention. Therefore, it is intended that the present invention covers such modifications and variations provided they come within the ambit of the appended claims and their equivalents.

I claim:

1. An automotive instrument cluster with a continuous light emitting diode (LED) bar graph, comprising:
    a base;
    a plurality of LED light sources placed on the base;
    a plurality of LED compartments resulting from mounting plate separating plurality of LED lights from each other;
    an applique covering a top surfaces of the plurality of LED compartments wherein the top surface of the applique is perceived by a user, and a bottom surface of the applique covers the plurality of LED compartments from inside,
    wherein the mounting plate is provided so that inner walls of a subsequent LED compartments maintain a predetermined gap with the bottom surface of the applique to enable a light to pass to an adjacent LED compartment.

2. The automotive instrument cluster as claimed in claim 1, wherein the plurality of LED light sources is placed on the base in a manner that the user perceives the continuous bar graph.

3. The automotive instrument cluster as claimed in claim 1, wherein the base comprises a printed wiring board (PWB) base.

4. The automotive instrument cluster as claimed in claim 1, wherein the applique comprises printing on a PC sheet or painted and laser etched on plastic.

5. The automotive instrument cluster as claimed in claim 1, wherein the plurality of LED compartments is either integrated with the mounting plate or a separate lighting compartment module fitted with the mounting plate or PWB base fitted therewith separately.

6. The automotive instrument cluster as claimed in claim 1, wherein shape of the plurality of LED compartments comprises one of square and rectangular and trapezoid and curved and triangular and circular and semicircular and elliptical.

7. The automotive instrument cluster as claimed in claim 1, wherein each bar graph comprises a shape, the shape being defined as one of: a square, a rectangle, a trapezoid, a curve, a triangle, a circle, semicircle, and an elliptical.

* * * * *